UNITED STATES PATENT OFFICE.

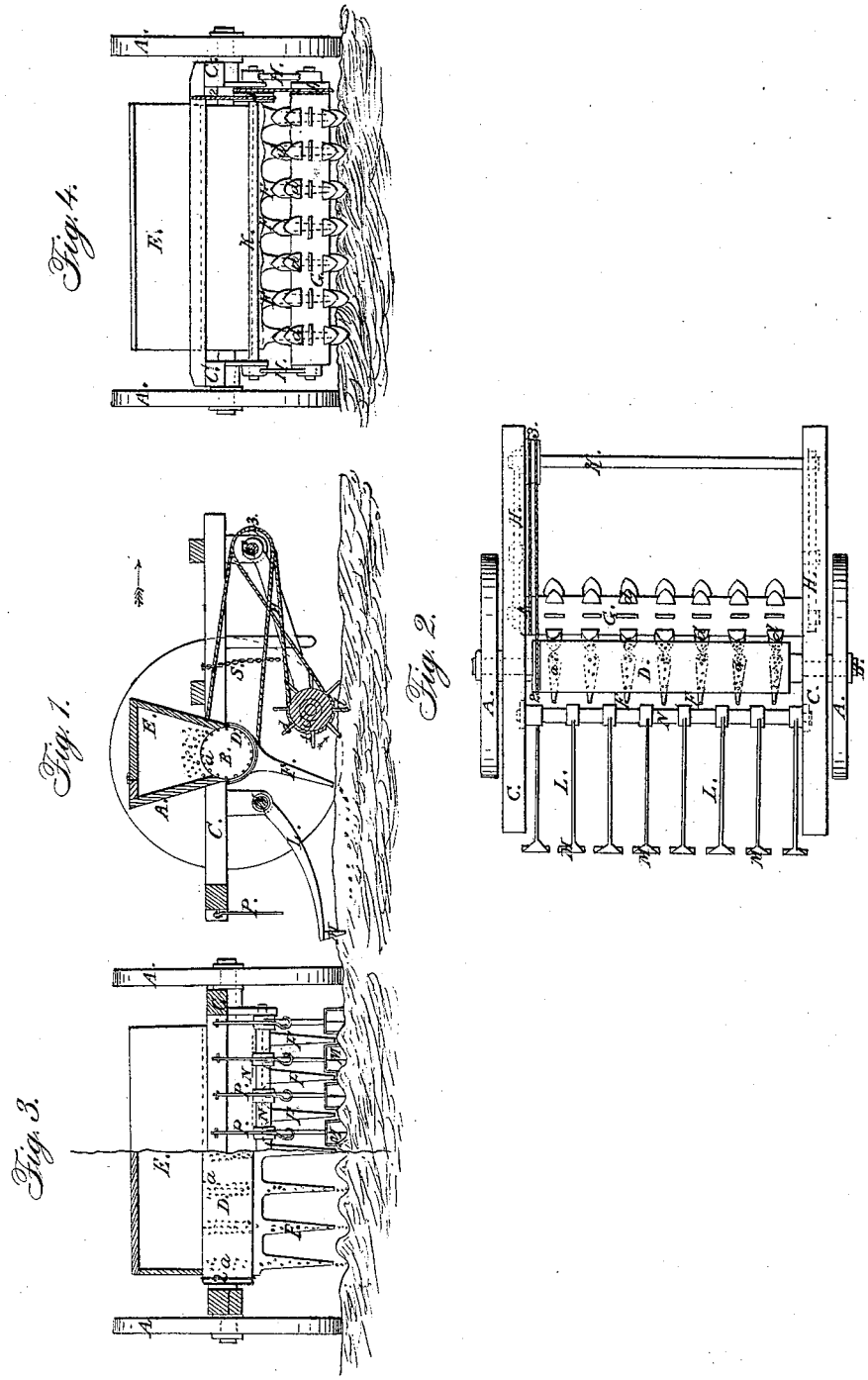

JOSEPH SUTTER, OF NEW YORK, N. Y.

IMPROVEMENT IN SEEDING-MACHINES.

Specification forming part of Letters Patent No. 28,914, dated June 26, 1860.

*To all whom it may concern:*

Be it known that I, JOSEPH SUTTER, of New York, in the county and State of New York, have invented a new and Improved Seeding-Machine; and I do hereby declare that the following is a full and exact description thereof, reference being had to the accompanying drawings, and to the letters of reference marked thereon.

Figure I represents a longitudinal section, and Fig. II a plan, of the machine. Fig III represents half a cross section, and the other half an end view of the machine, and Fig. IV shows a front view of the same.

Similar letters represent similar parts.

The nature of my invention consists in arranging and constructing the several parts of this machine in the manner hereinafter specified.

The driving-wheels A A are firmly attached to the main shaft B, which latter supports the frame C of the machine. Inside of the frame C a cylinder, D, is attached to the shaft B, over which the seed-hopper E is placed, fitting tight against the circumference of the cylinder D. The lower part of the cylinder is covered by a casing attached to the hopper E, having a certain number of spouts F.

The cylinder D is provided with cavities *a*, situated in a line with the spouts F, into which the seed or grain falls and discharges itself in the spouts, through which the same is conveyed into the furrows.

Close to and before the conveyers F a revolving shaft or cylinder, G, is placed, provided with points or barrows *d*, situated around its circumference and in a line with spouts F. This shaft or cylinder G turns in the ends of arms H H, the other end of which is attached to the fixed shaft K. By means of chains or ropes *s* attached to the end of said arms the cylinder G, together with the harrows, may be lifted out of the ground or lowered into the same, so as to cut the furrows any desired depth.

On the shaft B is a pulley, 2, placed, which communicates motion to the pulley 3 on the shaft K, and which latter communicates motion to the pulley 4 on the shaft or cylinder G, so as to turn the latter in a contrary direction to the motion of the machine, as indicated by the arrow.

At the end of the machine, behind the seed-spouts F, are the mold-boards M, attached to the ends of arms L, capable of turning on a fixed shaft, N, fast to the frame C. P are rods suspended from the frame to support the arms and mold-boards above the ground when the machine is not in operation. These mold-boards are situated between the seed-spouts F, and formed in the shape of a V, so as to throw the ground or soil on both sides. As the machine moves forward the points or harrows *d* on the cylinder G cut furrows in the soil at the required depth, as regulated by the position of the chains *s*, depositing the excavated soil on each side, forming a hill between the furrows. The seed-spouts F, situated directly behind the harrows *d* and in the same line, deposit the seed or grain into the furrows, when the mold-boards M, situated behind and between the seed-spouts F, enter the soil thrown up by the harrows and throw the same back again into the furrows and upon the seed or grain.

When the machine requires to be moved over the ground without operating, the harrow-cylinder G is lifted up clear of the ground by means of the chains *s* and the mold-boards M are raised up and suspended by the rods P. The seed-spouts F may be provided with valves to prevent the discharging of the seed when not required.

What I claim is—

The arrangement of the arms L, the mold-boards M, the seed-spouts F, the cylinder D as constructed, and the cylinder G, provided with harrows *d*, when the same are connected together and to the frame C in the manner and for the purpose specified.

JOSEPH SUTTER.

Witnesses:
HENRY E. ROEDER,
JOHN H. MÜLLER.